United States Patent
Lee et al.

[11] 3,944,275
[45] Mar. 16, 1976

[54] TRUCK BOX CONSTRUCTION

[76] Inventors: Vernon C. Lee, 1625 N. 4th St., Wahpeton, N. Dak. 58075; Thomas L. Korinek, 306 Dacotoh Ave., Breckenridge, Minn. 56520

[22] Filed: Aug. 19, 1974

[21] Appl. No.: 498,453

[52] U.S. Cl. ............................. 296/28 M; 52/758 B
[51] Int. Cl.² ...................................... B62D 27/00
[58] Field of Search ............... 296/28 M, 29, 28 D; 105/404; 52/758 B, 300, 274, 284

[56] References Cited
UNITED STATES PATENTS

| | | |
|---|---|---|
| 2,054,665 | 9/1936 | Tracy ................................ 52/758 B |
| 2,502,093 | 3/1950 | Johnson ............................ 296/28 D |
| 3,028,192 | 4/1962 | Jewell ................................. 296/29 |
| 3,675,379 | 7/1972 | Lambert et al. ...................... 52/274 |
| 3,777,426 | 12/1973 | Weiner ................................ 52/274 |
| 3,798,852 | 3/1974 | Nicoll ................................. 52/274 |
| 3,804,464 | 4/1974 | Gust .................................. 296/28 D |

*Primary Examiner*—Albert J. Makay

[57] ABSTRACT

A box side construction for truck or trailer boxes utilizing a unitary, all metal, formed side member which includes a single center reinforcing stake for fastening side panels in end to end relationship while achieving a strong, smooth and lightweight side panel for a box.

7 Claims, 4 Drawing Figures

U.S. Patent   March 16, 1976   3,944,275
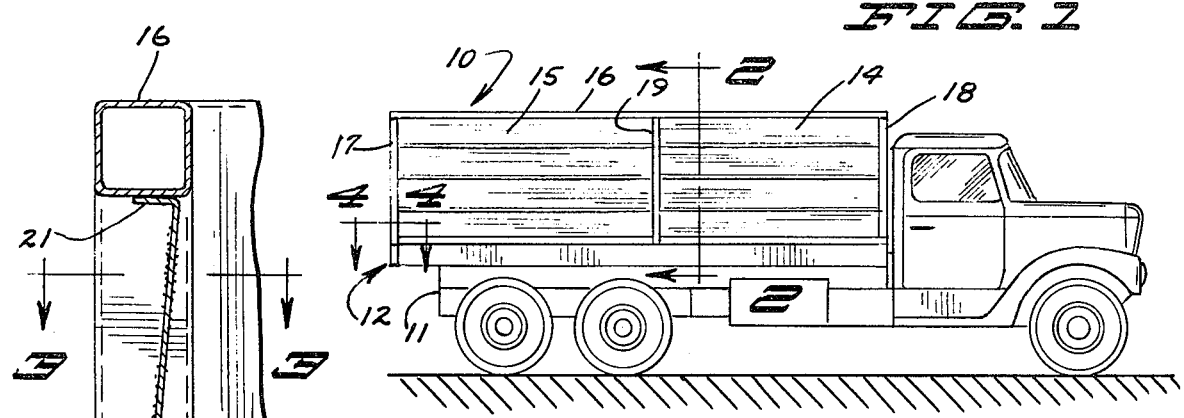
FIG. 1
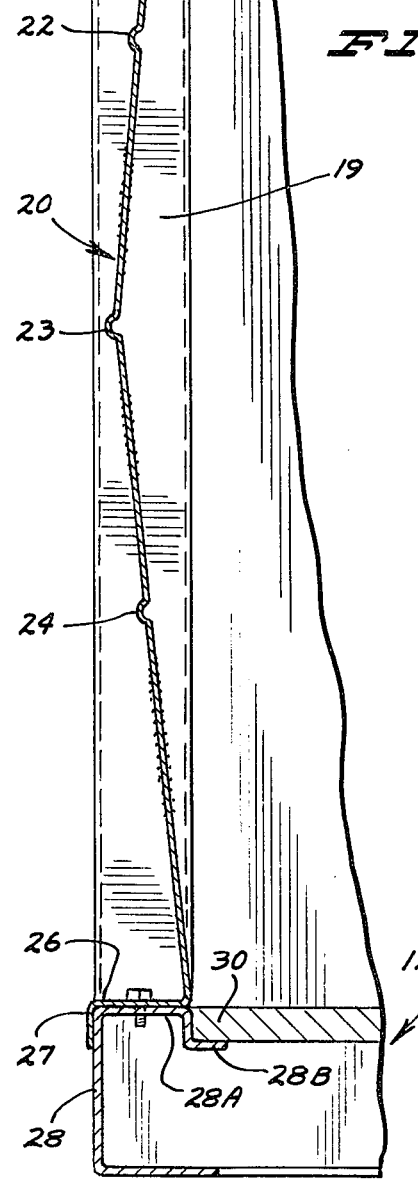
FIG. 2
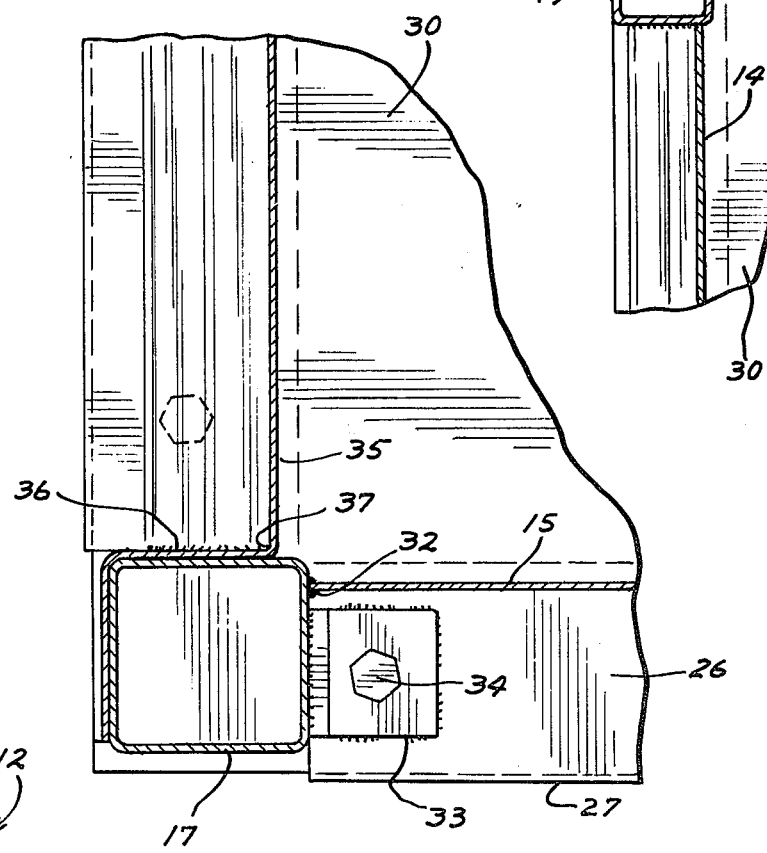
FIG. 3
FIG. 4

TRUCK BOX CONSTRUCTION

BACKGROUND OF THE INVENTION

1. Field of the Invention

The present invention relates to truck or trailer box structures using substantially stakeless side panels.

2. Prior Art

In the prior art, various all metal boxes have been advanced using a formed side panel for the box. For example, U.S. Pat. No. 3,804,464 shows a truck box with a formed side panel. The box sides of this general type are long and therefore cumbersome to form.

SUMMARY OF THE INVENTION

The present invention relates to a truck or trailer box construction, and more particularly to a uniquely made side wall configuration which is formed with a single center stake only, to provide for an all welded, steel side panel for a box that is easily formed and assembled.

The present invention permits the use of standard size sheets of material, which can be formed with suitable longitudinal beads for strengthening and also formed into an internal concave shape at the same time the beads are formed.

Two panels are abutted against opposite sides of a common center stake, and front and rear end stakes are also used at the opposite ends of the panels. The panels are welded to the stakes to avoid the necessity for butt welding the panels together or otherwise joining them in abutting relationship. In addition, a top rail member is placed on the two panels and three stakes, namely the front, center and rear stakes, and this top rail forms a secure support for holding tarpaulin bows or additional side extensions. The center stake provides adequate support in the vertical direction for heavy objects such as these items.

The longitudinal beads for strengthening the panels and the concave shape, which is desirable from a strength standpoint, can be formed in standard machines and the long box sides are made sectionalized without incurring the time and effort necessary to join the panels in abutting relationship.

BRIEF DESCRIPTION OF THE DRAWINGS

FIG. 1 is a side elevational view of a typical truck box having a side wall member constructed in accordance with the present invention;

FIG. 2 is a sectional view taken as on line 2—2 in FIG. 1;

FIG. 3 is a fragmentary sectional view taken as on line 3—3 in FIG. 2; and

FIG. 4 is a horizontal sectional view of one of the corner posts on the side members illustrating a preferred method of attaching the front or rear walls of the box to the side members.

BRIEF DESCRIPTION OF THE DRAWINGS

A truck or trailer box illustrated generally at 10 is a normal, rectangular box and is mounted onto a frame 11 of a truck through a suitable mounting frame. The box length may be in the range of 18 to 20 or more feet and the box normally has a width of just under eight feet in order to be within the legal limits. The box is made up of a floor and support frame member of conventional design, and which is indicated generally at 12. The frame is a rectilinear frame with front and rear walls supported on the frame, and extending between the side walls in the normal manner. An end gate of suitable design is used at the rear of the box.

A side wall assembly illustrated generally at 13 includes a first metal panel 14, a second panel 15, a top rail 16 that extends the full length of the box, square metal tubular upright end stakes 17 and 18, and a square metal tubular center stake 19 positioned between the first and second panels 14 and 15.

When the truck box is eighteen to twenty or more feet long, the panels 14 and 15 thus can be approximately one-half of this length and therefore well iwthin the range of sizes that can be handled conveniently and formed in conventional metal forming machines.

Typically, the side panels will be formed as shown in FIG. 2. Here, the first panel 14 (the second panel 15 would be substantially the same in configuration), is shown. It has an outward bow forming an inwardly facing concave surface (facing toward the center of the box) in the center portions thereof as indicated at 20.

Also, as can be seen, a fastening lip 21 is formed on the panel at the top edge thereof, and this lip can be welded or otherwise suitably attached to the top rail 16. A plurality of longitudinally extending beads 22,23 and 24, respectively, are formed into the panel prior to installation. The bead 23 is at the midsection and forms the outer most extension of the box, or in other words, is at the deepest part of the concave surface. As can be seen, the upright center stake 19 is positioned at one end of each of the panels 14 and 15 in the center of the box wall and the stake 19 is of a width (in lateral direction of the box) greater than the depth of concavity of the wall so that the upper and lower edges and also the center bead 23 do not extend laterally beyond the stake. The entire end of the panel 14 thus is welded directly to the center stake 19 and no part of the panel 14 extends laterally beyond the stake.

The lower edge of the panel 14 has a flange 26 formed therein, and a lip 27 that is formed on and depends from the flange 26. The lip 27 is positioned on the outside of the frame member 28 of the bed 12. Frame member 28 as shown has a vertical side wall, a top flange 28A, and an offset section 28B for receiving the floor 30 of the box. This frame member is of conventional design commonly used in truck or trailer boxes, and the upper flange 28A supports the flange 26. The flanges 26 of the side panels 15 and 14 are bolted to the flange 28A when in position.

It can thus be seen that the upper flanges 21 of the panels 14 and 15 are welded to the top rail 16, and one end edge of each of the panels 14 and 15 is welded to opposite sides of the center stake 19. The opposite ends of panels 14 and 15 are welded to the respective stakes at the front and rear of each of the side wall assemblies.

The front box wall 31 is shown schematically in FIG. 2 as well, and the means for attaching the front or rear walls of the box to the corner stakes 17 and 18 is illustrated in FIG. 4.

In FIG. 4, a typical side wall panel 15 is shown, at the rear portions thereof, and the rear stake 17, which would form the right hand rear corner of the truck box shown in FIG. 1, is welded to the rear end edge of panel 15 as at 32. An angle clip 33 is used to support the stake 17, and also is then welded to the upper surface of the flange 26 of the side panel panel 15. The flange 26 as can be seen, has a series of holes spaced along the length thereof which align with holes in the flange 28A for bolting the flanges 26 and 28A together. As can be seen the clip 33 also has a hole therein and a bolt 34 fastens the clip to the flange 28A of the box frame member 28.

The rear box wall is indicated generally at 35. The end of the panel 35 is welded to an upright angle clip 36 that fits closely against two sides of the stake 17 (the inside wall and the rear wall of the stake) and is fastened thereto with suitable bolts or cap screws (not shown) to hold it in place. The angle member 36 can extend along the full length of the stake). In this manner, a tight joint is achieved because the panel 35 is welded as at 37 to the angle 36 to close any gap, and the welding shown at 32 closes or seals the panel 15 to the end stake 17. The means for fastening the side wall to the front wall can be substantially the same as that shown in FIG. 4.

Referring specifically to FIG. 3, the junction between the center stake 19 and the first and second side panels 14 and 15 is shown. The center stake, as well as the stakes 17 and 18 are welded to the top rail 16, and the stake 19 serves to support the top rail 16 adequately with respect to the truck box frame 28 so that heavy objects such as a tarpaulin bow or other members that have substantial weight are easily supported on the box through the top rail. In addition, the box is closed tightly and a good seal is provided by the clamping of the flanges 26 against the flange 28A, and the lip 27 also tends to seal the side panels and provides a drip cap to insure drainage of water from the side walls without seepage into the box interior. The reinforcing ribs or beads 22, 23 and 24 provide additional strength so that the thickness of the panels 14 and 15 can be reduced. For example, a 16 gauge hot roll material with the beads provided, (which are formed on a substantially 3/16 inch inside radius) have been found to give adequate strength.

Other specific concave shapes can be used for the side panels, but as shown only two side panels are used and they are fixed to a single center stake to form the desired length of side wall.

The use of a single square tubular post 19 also is beneficial because it presents a relatively smooth member on the interior of the box, which makes complete removal of material from the box easy.

What is claimed is:

1. A welded wall assembly construction for a truck or trailer box comprising a pair of metal panels having opposite side surfaces and end edges, and a tubular support stake between the adjacent ends of said panels and joining said panels in end to end relationship, and said ends of said panels being contiguous to and welded to opposite sides of said support stake whereby surfaces of said support stake form a portion of the wall assembly on both sides of said wall assembly between the ends of said panels, said support stake having a pair of generally planar side surfaces forming a lateral width of the stake in direction of the thickness of said panels, and wherein said panels are formed to be concave to provide increased rigidity in longitudinal direction, the amount of concavity of said panels being not substantially greater than the lateral width of said support stake so that the entire end edge of each of said panels adjacent said stake is contiguous to the stake and when welded to the stake a tight seam is formed.

2. The combination as specified in claim 1 and an additional pair of stakes, one at each of the opposite ends of each of said panels from said first mentioned stake, said additional pair of stakes being welded to said opposite end edges of said panels, and a top rail fastened to said panels and to said stakes and extending along one edge of said panels to form a complete box side wall.

3. The combination as specified in claim 2 and a box bed including a peripheral frame, and means to attach said panels and said stakes to the box bed comprising a flange formed on lower longitudinal edge of said panels, said flange resting on said frame with the wall assembly in position thereon, said flange being adapted to be bolted to said bed.

4. The combination as specified in claim 3 and a lip member formed integral with said flange, said lip member extending on the outside of said frame when said flange is positioned on said frame, said lip member forming a drip cap at the edge of said frame.

5. The combination as specified in claim 1 wherein said panels are of a length in the range of at least ten feet, and a plurality of longitudinally extending reinforcing ribs formed in each of said panels.

6. The combination as specified in claim 3 wherein said panels each have a bent over lip at the upper portions thereof, and wherein said lip is fixed to said top rail along the length of said panels.

7. The combination as specified in claim 1 wherein the concave surfaces of said panels face in a direction toward the intended inside of a box on which the panels are to be used, and wherein the support stake has a generally planar inside surface facing in the same direction as said concave surfaces of said panels, the concave surfaces of said panels and the planar inside surface of said stake generally lying along a common line adjacent the bottom of said panels.

* * * * *